United States Patent

Silzer et al.

[11] Patent Number: 5,150,941
[45] Date of Patent: Sep. 29, 1992

[54] SIDE WINDOW AIR DEFLECTOR INCORPORATING A SIDE VIEW MIRROR

[75] Inventors: Elmar Silzer, Laguna Beach; Emil Y. Leung, Monterey Park, both of Calif.

[73] Assignee: Arvan, Inc., Gardena, Calif.

[21] Appl. No.: 795,027

[22] Filed: Nov. 20, 1991

[51] Int. Cl.⁵ .............................. B60J 1/20
[52] U.S. Cl. ......................... 296/152; 296/91; 296/153; 296/180.1; 454/135
[58] Field of Search ............ 296/91, 180.1, 152; 454/135; 248/486, 481, 479

[56] References Cited

U.S. PATENT DOCUMENTS

| | | | |
|---|---|---|---|
| 2,622,921 | 12/1952 | Zagel | 296/44 |
| 2,696,154 | 12/1954 | Eaton | 454/135 |
| 2,797,126 | 6/1957 | Brooks | 296/44 |
| 3,757,663 | 9/1973 | McCarroll | 454/135 |
| 3,785,699 | 1/1974 | Molaskey et al. | 296/152 |
| 3,803,994 | 4/1974 | McCarroll | 98/2.12 |
| 4,033,245 | 7/1977 | DeRees | 98/2.12 |
| 4,062,272 | 12/1977 | McCarroll | 454/135 |
| 4,191,097 | 3/1980 | Groen | 454/135 |
| 4,347,781 | 9/1982 | Hassell | 296/91 |
| 4,538,851 | 9/1985 | Taylor | 296/180.1 |
| 4,844,529 | 7/1989 | O'Saben | 296/91 |

Primary Examiner—Robert R. Song
Attorney, Agent, or Firm—Raymond Sun

[57] ABSTRACT

A combined automobile deflector and side view mirror unit is attached to a front edge of a window frame of an automobile door. The automobile deflector and side view mirror unit comprises a mirror housing secure to the window frame and supporting a side view mirror, and a shroud having a leading edge extending along the periphery of the front edge of the window frame and attached thereto. The shroud also has a curved portion for enclosing the side view mirror, the curved portion attached to the mirror housing.

15 Claims, 3 Drawing Sheets

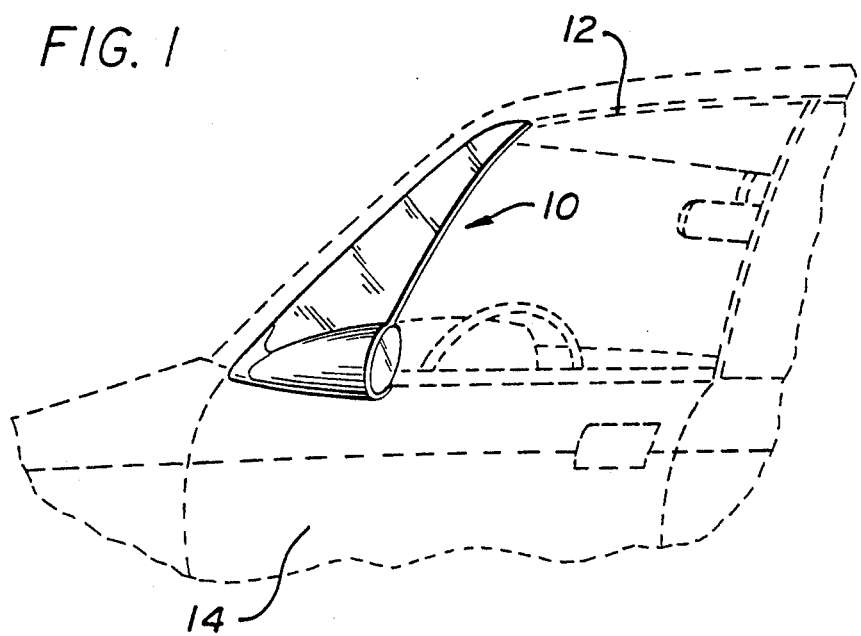
FIG. 1
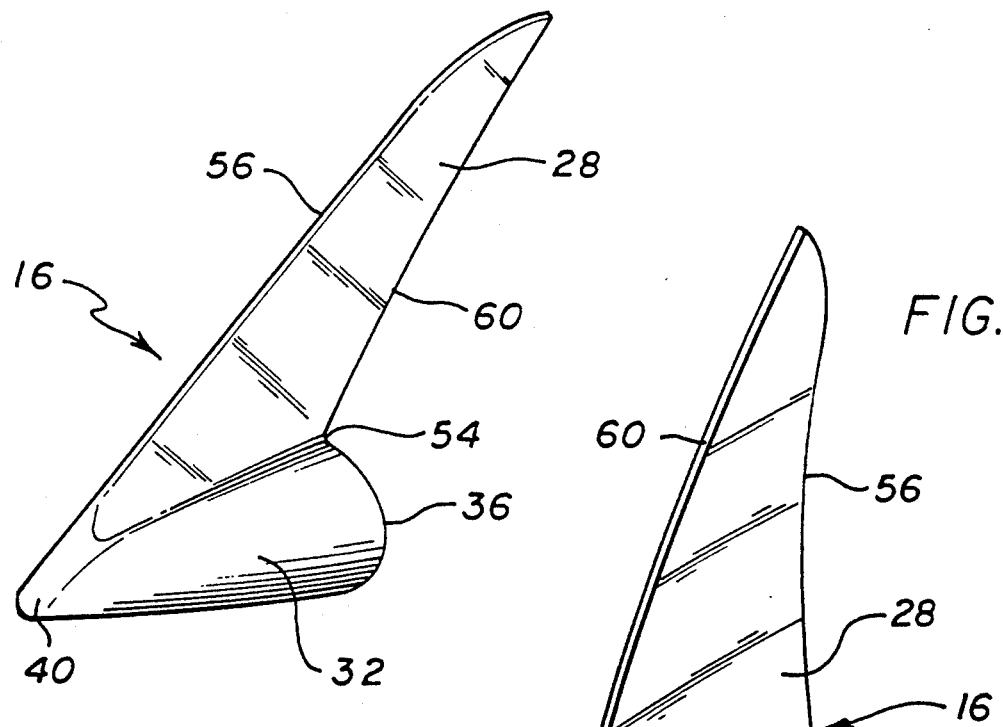
FIG. 2
FIG. 3

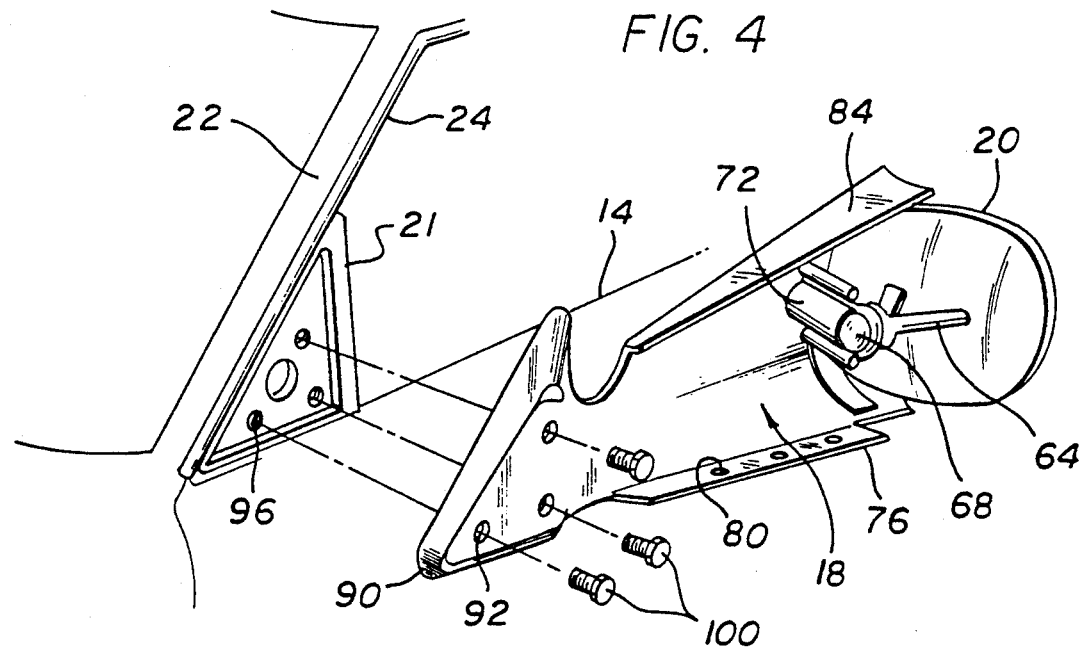
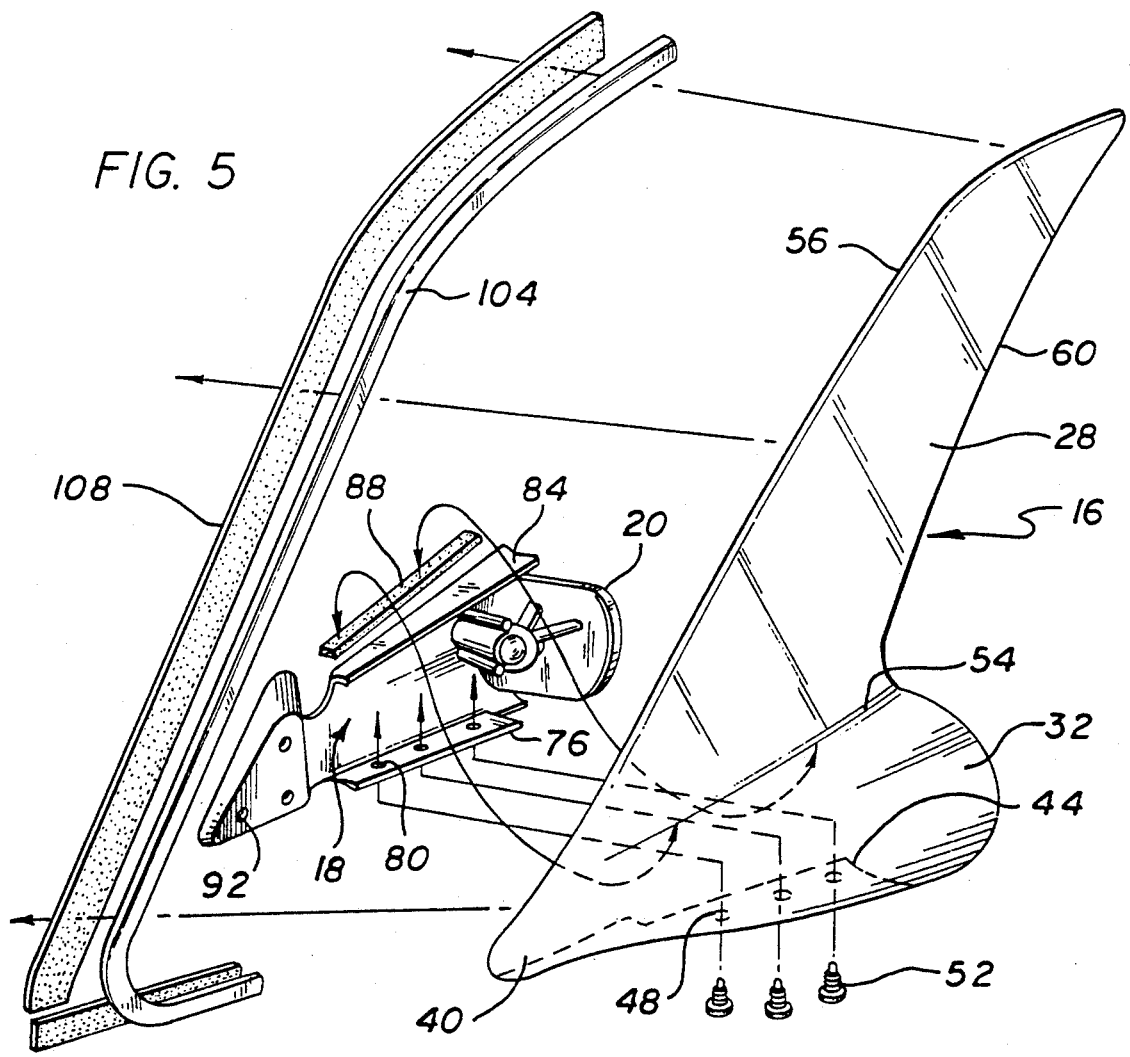

SIDE WINDOW AIR DEFLECTOR INCORPORATING A SIDE VIEW MIRROR

BACKGROUND OF THE INVENTION

1. Field of the Invention

The present invention relates to automobile deflectors and side view mirrors, and in particular, to a combined aerodynamic deflector and side view mirror unit which may be easily mounted to a window frame of an automobile door without the add-on look.

2. Description of the Related Art

Side view mirrors normally extend from the side of an automobile and, so situated, contribute to increased wind drag. Efforts have been made to reduce the drag by providing streamlined mirror housings, such as that illustrated in U.S. Pat. No. 4,538,851. However, such streamlined mirror housings do not effectively reduce the drag because they typically comprise a small streamlined block which extends from the side of the automobile and does not smoothly direct all the air flow around the side of the automobile. Such streamlined mirror housings also do not effectively deflect wind, rain and dirt, which often results in such undesirable wind, rain and dirt being introduced into the interior of the automobile.

There have also been a number of automobile deflectors in which the deflector itself is added or mounted on to an automobile door to deflect wind, rain and, sometimes, dirt. These deflectors are normally separate from the side view mirror unit and when mounted appears as an add-on item, thereby reducing their aesthetic appeal. These separate add-on deflectors often lead to bulky, complicated and sometimes unsafe arrangements extending from the side of an automobile, resulting in poor aerodynamics, increased noise, undesirable wind blasts, and wind drag, all of which impair fuel efficiency. Depending upon the configuration, unclean air and dirt particles may also be introduced into the interior of the automobile, and the deflector may not be effective in shielding the driver from the sun. The above drawbacks together contribute to reduced driving safety and comfort. Examples of such deflectors are illustrated in U.S. Pat. Nos. 4,884,529 and 4,033,245.

These deflectors suffer from another drawback in that they are not easy to install and often require substantial work, including drilling, to be mounted on to the side of an automobile. The required drilling is undesirable because it requires modifying the existing structure of the automobile, which may reduce the marketability of such deflectors. These deflectors are also not easily replaceable in light of the substantial work involved in installing them.

SUMMARY OF THE DISCLOSURE

The automobile deflector and side view mirror unit according to an embodiment of the present invention provides a combined automobile deflector and side view mirror unit which is both aerodynamic and is effective in deflecting wind and rain, preventing wind blasts, and shielding the driver from dirt. The deflector has an aerodynamically streamlined shroud to reduce wind drag and resistance. The aerodynamically streamlined shroud rests against the entire front edge of the window frame of the automobile to direct airflow around the entire front edge of the automobile side window, resulting in a cleaner airflow. The shroud also acts to shade the driver from the sun at different angles. The deflector is made from a material which is lightweight, has high impact resistance, and may be tinted to reduce glare. The above advantages allow for open-window driving and promotes improved driver comfort and safety.

The automobile deflector and side view mirror unit according to an embodiment of the present invention is easy to install and can be firmly mounted to the side of an automobile by using common household tools without the need for substantial work or the use of unnecessary tools. To be mounted, this automobile deflector and side view mirror unit does not require any drilling or other modifications to be made to the existing structure of the automobile. This allows this automobile deflector and side view mirror unit to be easily replaceable. This automobile deflector and side view mirror unit is also provided in one of a number of standard automobile colors so that it is mounted without the add-on look and is aesthetically appealing, thereby increasing its marketability.

The automobile deflector and side view mirror unit according to an embodiment of the present invention is attached to a front edge of a window frame of an automobile door, and comprises a mirror housing supporting a side view mirror at a rear portion thereof, the housing including a front portion, an upper flat plate extending outwardly from the door and a lower flat plate extending outwardly from the door, the lower plate provided with a plurality of first holes. A plurality of bolts secure the front portion of the housing to a mounting plate in the window frame. This deflector and side view mirror unit also includes a shroud adapted to be attached to both the front edge of the window frame and the housing, the shroud including an elongated portion having a leading edge extending along the periphery of the front edge of the window frame, a curved portion for enclosing the side view mirror, and a plate extending outwardly from a lower edge of the curved portion, the plate provided with a plurality of second holes. A plurality of fasteners are threaded through the first and second plurality of holes to attach the shroud to the housing. A first strip of adhesive tape attaches the lower edge of the curved portion of the shroud to the upper flat plate of the housing. A strip of molding is fitted about the leading edge of the elongated portion, and a second strip of adhesive tape attaches the leading edge of the elongated portion of the shroud to the periphery of the front edge of the window frame.

BRIEF DESCRIPTION OF THE DRAWINGS

Further objects, advantages and features of the invention will become apparent from the detailed description of the preferred embodiments when read in conjunction with the accompanying drawings, in which:

FIG. 1 is a perspective view of an automobile deflector and side view mirror unit according to an embodiment of the present invention mounted on a window frame of an automobile door;

FIG. 2 is a perspective view of the automobile deflector of FIG. 1;

FIG. 3 is a perspective rear view of the automobile deflector and side view mirror unit of FIG. 1;

FIG. 4 is an exploded perspective view illustrating how the mirror housing of the side view mirror of the embodiment of FIG. 1 is mounted to the window frame of an automobile door;

FIG. 5 is an exploded perspective view illustrating how the deflector of the embodiment of FIG. 1 is mounted to the automobile door and the mirror housing of FIG. 4;

DETAILED DESCRIPTION OF THE PREFERRED EMBODIMENTS

Figure 6:
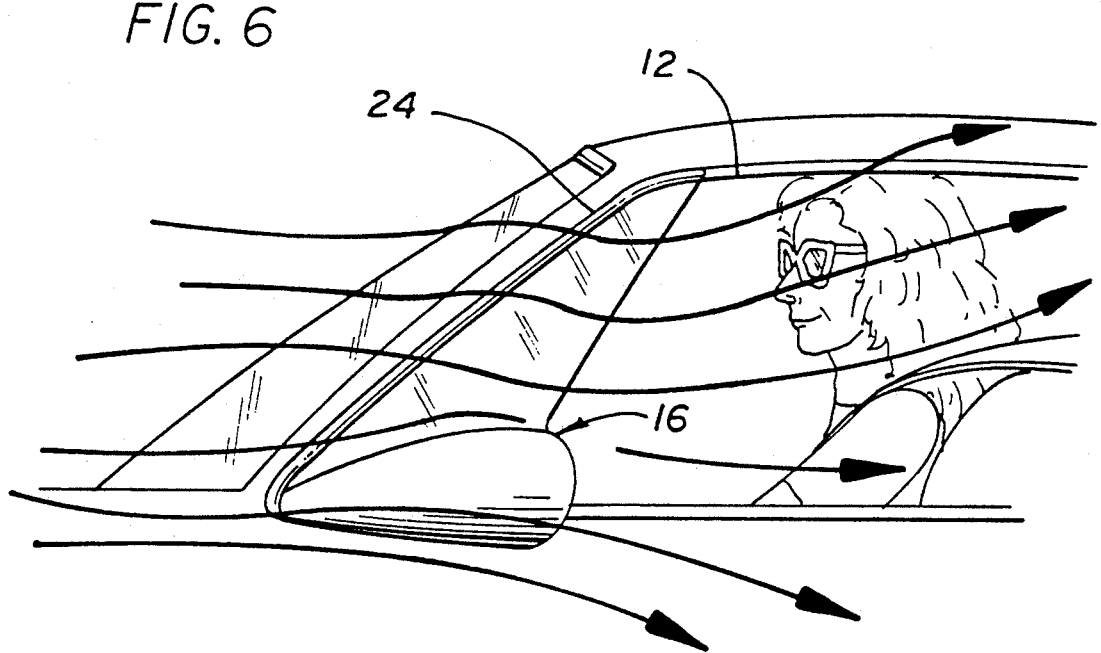
FIG. 6 illustrates the direction of the air and particle flow around the automobile deflector and side view mirror unit of FIG. 1.

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

Referring to FIG. 1, an automobile deflector and side view mirror unit 10 is shown mounted to the front edge of a side window 12 of an automobile door 14. Referring to FIGS. 2-5, the deflector and side view mirror unit 10 comprises a shroud 16 acting as a deflector and a mirror housing 18 which has a side view mirror 20 provided thereon. The mirror housing 18 is mounted to a mounting plate 21 of a window frame 22 of the automobile door 14, and the shroud 16 is further mounted to a front edge 24 of the window 12 and the mirror housing 18 to provide a shield and cover for the mirror housing 18 and the entire front edge 24 of the window 12.

The shroud 16 comprises an upper elongated portion 28 and a lower curved portion 32. The curved portion 32 encases and covers the side view mirror 20 and the mirror housing 18. The curved portion 32 assumes the curved shape of the side view mirror 20 at a rear portion 36 and narrows towards a front portion 40. A plate 44 is formed from the bottom edge of the curved portion 32 and is provided with three holes 48 for receiving nylon fasteners 52 used to secure the shroud 16 to the mirror housing 18.

The elongated portion 28 is shaped like a fin and extends from the upper front edge of the window 12, where its width is the narrowest, downward to a dividing edge 54 which divides the curved portion 32 and the elongated portion 28, where the width of the elongated portion 28 is the largest. A leading edge 56 of the elongated portion 28 is shaped to follow the contour of the front edge 24 of the window 12, so that the leading edge 56 is fitted against the front edge 24 of the window 12. The elongated portion 28 is shaped to curve outwardly from the window 12 to create an open space between the window 12 and a trailing edge 60 of the elongated portion 28.

The elongated portion 28 and the curved portion 32 are therefore shaped to provide the shroud 16 with a streamlined configuration which is both aesthetically appealing and is effective in directing the air flow around the shroud 16 in a manner to reduce the wind drag and to shield the driver from wind, dirt and rain.

The shroud 16 is preferably constructed from a one-piece mold of a thermo-plastic material, such as polycarbonate, or "ACRYLITE," produced by CYRO, or "LEXEN," produced by General Electric. These materials are lightweight and have high impact resistance. The curved portion 32 of the shroud 16 may be provided with any desired color, but is preferably provided in one of a number of standard automobile colors, thereby blending the color of the curved portion 32 to the color of the automobile without the add-on look.

It is appreciated and understood that the deflector is not limited to the shroud 16 described in the embodiment above, and that a deflector having a different shape and size, and being made of a different material, may be provided without departing from the spirit and scope of the present invention.

Referring to FIGS. 4-5, the mirror housing 18 is molded from hard plastic, and preferably ABS plastic. The mirror housing 18 is provided with a conventional side view mirror 20. The mirror 20 has a mirror backing 64 attached to a rotational ball 68 fitted in a friction-type metal bracket 72 which is mounted to the mirror housing 18. The mirror housing 18 has a flat lower plate 76 extending outwardly from the lower portion of the mirror housing 18 and is provided with three holes 80, corresponding to the three holes 48 of the shroud 16, which are adapted to receive the nylon fasteners 52. The mirror housing 18 also has a flat upper plate 84 extending outwardly from the upper portion of the mirror housing 18 and adapted to receive a double-sided adhesive foam tape 88 which adheres the upper plate 84 to the inside of the dividing edge 54 of the shroud 16. The front portion 90 of the mirror housing 18 is shaped as the mounting plate 21 and is provided with three holes 92 which correspond in shape and size to three holes 96 on the mounting plate 21 which are conventionally provided by the automobile manufacturer to receive bolts for securing the manufacturer-provided side view mirror to the mounting plate 21.

It is appreciated and understood that the mirror housing 18 is not limited to the embodiment described above, and that a mirror housing having a different shape and size, and being made of a different material, may be provided for housing a side view mirror without departing from the spirit and scope of the present invention.

To install the automobile deflector and side view mirror unit 10, an individual first removes the bolts which secure the original manufacturer side view mirror to the mounting plate 21. After removing the manufacturer side view mirror, the individual attaches the mirror housing 18 to the mounting plate 21 by screwing three bolts 100 through the corresponding holes 92 and 96, as shown in FIG. 4.

Referring to FIG. 5, the individual then applies a strip of double-sided adhesive foam tape 88 to the upper plate 84 of the mirror housing 18. A strip of vinyl molding 104 is slide-fitted over the leading edge 56 of the elongated portion 28 of the shroud 16, and another strip of double-sided adhesive foam tape 108 is applied to the molding 104 and the leading edge 56. Thereafter, the shroud 16 is attached to the mirror housing 18 by pressing the inside of the dividing edge 54 to the adhesive foam tape 88, and by fitting three nylon fasteners 52 through holes 48 and 80. The leading edge 56 of the shroud 16 having the foam tape 108 applied to the molding 104 is then pressed firmly against the front edge 24 of the window 12.

Thus, the mirror housing 18 is attached to the mounting plate 21 by means of the bolts 100. The shroud 16 is attached to the mirror housing 18 by means of the adhesive foam tape 88 and the nylon fasteners 52, and is attached to the front edge 24 of the window 12 by means of the adhesive foam tape 108. The adhesive foam tapes 88 and 108 are preferably made of a type which is approved by automobile manufacturers for automotive usage, and which provides the required adhesive strength. Alternatively, Velcro may be used instead of the adhesive foam tapes. Thus, the shroud 16 and the mirror housing 18 are firmly attached to the automobile.

While the shroud 16 and mirror housing 18 are described above as being attached to the automobile by means of the bolts 100, nylon fasteners 52, and adhesive foam tapes 88 and 108, it is appreciated and understood that other attachment means may be used without departing from the spirit and scope of the present invention.

Figure 8:
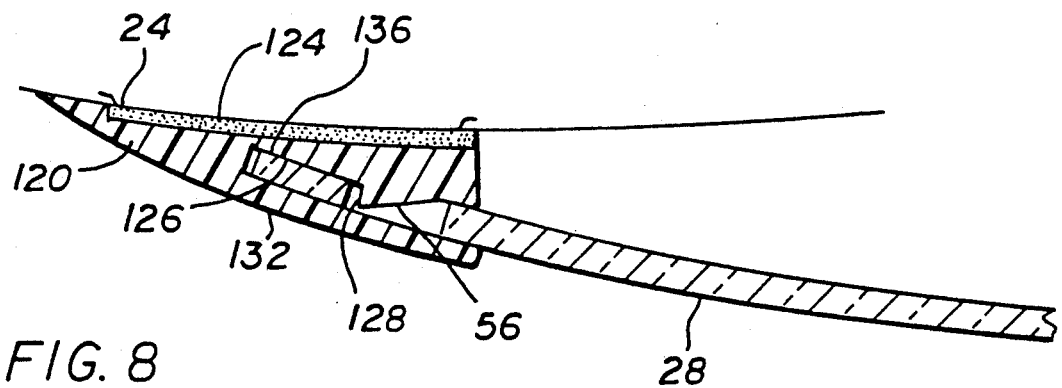
FIG. 8 illustrates a cross-sectional top plan view of an alternative embodiment of the present invention in which the deflector is slide-fitted into a channel provided in a molded gasket attached to the front edge of a side window.

For example, in an alternative embodiment shown in FIG. 8, a gasket 120 molded from flexible material may be secured to the front edge 24 of the window 12 by an adhesive strip 124. The gasket 120 is provided with a channel 126 having a hook-shaped portion 128 defining a slot 132. The leading edge 56 of the shroud 16 is provided with an extension 136 which is slide-fitted into the slot 132 in the channel 124 to secure the shroud 16. The shroud 16 may be easily removed from the gasket 120 by gently pulling the shroud 16 outwardly. The extension 136 of the shroud 16 is easily inserted into and removed from the slot 132 through the hook-shaped portion 128 because the flexible material used for the gasket 120 allows the hook-shaped portion 128 to be compressed and flexed for the extension 136 to be slid therethrough. In this embodiment, the mirror housing 18 may be attached to the mounting plate 21 and the shroud 16 may be attached to the mirror housing 18 in the manner shown and described above.

Figure 7:
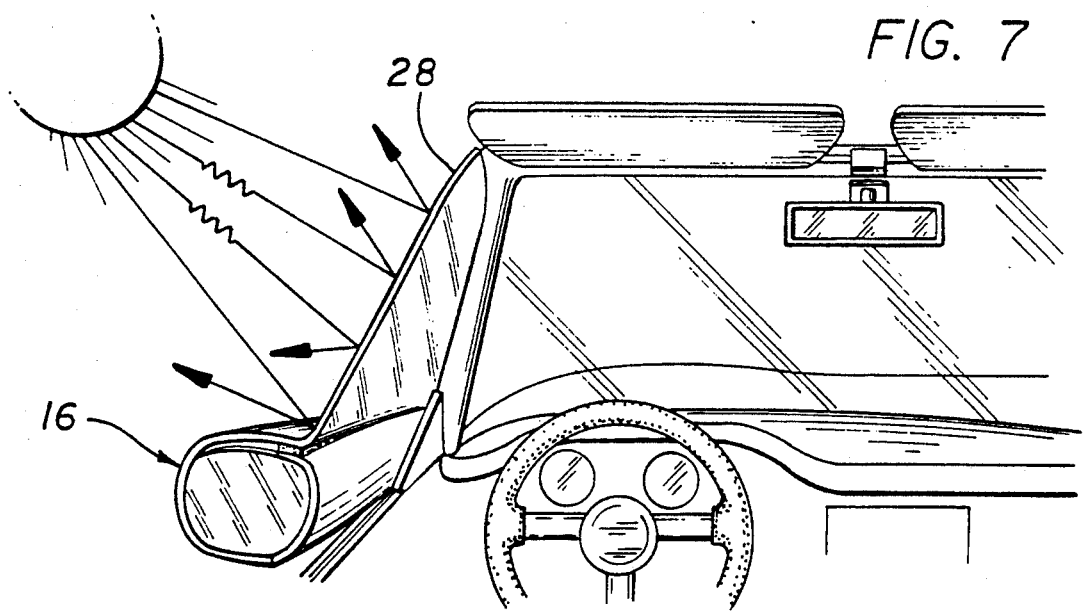
FIG. 7 illustrates how the automobile deflector and side view mirror unit of FIG. 1 acts to shade the driver from sun light and glare.

Referring to FIG. 6, the shroud 16 and the mirror housing 18 provides a combined automobile deflector and side view mirror unit in which the shroud 16 is provided with a streamlined shape so that it is both aerodynamic and effective in deflecting wind and rain, preventing wind blasts, and shielding the driver from dirt. The streamlined shroud 16 also reduces wind drag and resistance. The shroud 16 rests against the entire front edge 24 of the window 12 to direct airflow around the entire front edge 24 of an automobile side window 12, resulting in a cleaner airflow. Referring to FIG. 7, the elongated portion 28 of the shroud 16 also acts to shade the driver from the sun at different angles, and may be tinted to reduce glare. The above advantages allow for open-window driving and promotes improved driver comfort and safety.

The shroud 16 and the mirror housing 18 are easy to install and can be firmly mounted to an automobile door by using common household tools without the need for substantial work or the use of unnecessary tools. To mount the shroud 16 and the mirror housing 18, no drilling or other modifications need to be made to the existing structure of the automobile. The shroud 16 may also be easily replaced. The shroud 16 and the mirror housing 18 are mounted without the add-on look and is aesthetically appealing, thereby increasing its marketability.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A combined automobile deflector and side view mirror unit for attachment to a front edge of a window frame of an automobile door, comprising:
   a mirror housing secured to the window frame and supporting a side view mirror; and
   a shroud having an elongated portion having a leading edge attached to the entire periphery of the front edge of the window frame, the elongated portion extending outwardly in a curved fashion from the front edge thereof to define an open space between the door and the elongated portion, the elongated portion further having a curved portion at a lower end thereof for enclosing the mirror housing.

2. The combined automobile deflector and side view mirror unit of claim 1, wherein the mirror housing includes a lower plate extending outwardly from the door, the lower plate provided with a plurality of first holes, and wherein the shroud includes a plate extending inwardly from a lower edge of the curved portion, the plate provided with a plurality of second holes, further comprising:
   a plurality of fasteners threaded through the plurality of first and second holes to attach the shroud to the mirror housing.

3. The combined automobile deflector and side view mirror unit of claim 1, further comprising a plurality of bolts for securing the mirror housing to the window frame.

4. The combined automobile deflector and side view mirror unit of claim 1, wherein the mirror housing includes an upper plate extending outwardly from the door, further comprising:
   a strip of adhesive tape for attaching an edge of the curved portion of the shroud to the upper plate of the mirror housing.

5. The combined automobile deflector and side view mirror unit of claim 4, wherein the strip of adhesive tape has adhesive applied to both sides thereof.

6. The combined automobile deflector and side view mirror unit of claim 1, further comprising a strip of adhesive tape for attaching the leading edge of the shroud to the periphery of the front edge of the window frame.

7. The combined automobile deflector and side view mirror unit of claim 6, wherein the strip of adhesive tape has adhesive applied to both sides thereof.

8. The combined automobile deflector and side view mirror unit of claim 1, further comprising a strip of molding fitted along the leading edge of the shroud.

9. The combined automobile deflector and side view mirror unit of claim 1, wherein the shroud is made from a lightweight, high-impact resistant material.

10. The combined automobile deflector and side view mirror unit of claim 1, wherein the shroud directs the air flow around the front edge of the window frame and away from the interior of the automobile.

11. The combined automobile deflector and side view mirror unit of claim 1, further comprising a gasket secured along the front edge of the window frame, the gasket having a channel for receiving and holding the leading edge of the shroud.

12. A combined automobile deflector and side view mirror unit for attachment to a front edge of a window frame of an automobile door, comprising:
- a mirror housing supporting a side view mirror at a rear portion thereof and including a front portion;
- means for securing the front portion of the housing to the window frame;
- a shroud including an elongated portion having a leading edge extending along the entire periphery of the front edge of the window frame, the elongated portion extending outwardly in a curved fashion from the front edge thereof to define an open space between the door and the elongated portion, the elongated portion further including a curved portion at a lower end thereof for enclosing the mirror housing;
- means for securing the shroud to the mirror housing; and
- means for attaching the leading edge of the elongated portion of the shroud to the entire periphery of the front edge of the window frame.

13. A combined automobile deflector and side view mirror unit for attachment to a front edge of a window frame of an automobile door, comprising:
- a mirror housing supporting a side view mirror at a rear portion thereof, the housing including a front portion, an upper plate extending outwardly from the door and a lower plate extending outwardly from the door, the lower plate provided with a plurality of first holes;
- a plurality of bolts for securing the front portion of the housing to the window frame;
- a shroud adapted to be attached to both the front edge of the window frame and the mirror housing, the shroud including an elongated portion having a leading edge extending along the entire periphery of the front edge of the window frame, the elongated portion extending outwardly in a curved fashion from the front edge of the window frame and defining an open space between the door and the elongated portion, the elongated portion further including a curved portion at a lower end thereof for enclosing the mirror housing, and a plate extending inwardly from a lower edge of the curved portion, the plate provided with a plurality of second holes;
- a plurality of fasteners threaded through the first and second plurality of holes to attach the shroud to the housing;
- a first strip of adhesive tape for attaching an edge of the curved portion of the shroud to the upper plate of the housing;
- a strip of molding fitted along the leading edge of the elongated portion; and
- a second strip of adhesive tape for attaching the leading edge of the elongated portion of the shroud to the entire periphery of the front edge of the window frame.

14. The combined automobile deflector and side view mirror unit of claim 13, wherein the elongated portion directs the air flow around the front edge of the window frame and shields the interior of the automobile.

15. The combined automobile deflector and side view mirror unit of claim 12, wherein the elongated portion directs the air flow around the front edge of the window frame and shields the interior of the automobile.

* * * * *